United States Patent
Ross et al.

[15] 3,659,668
[45] May 2, 1972

[54] STEERING CLUTCH AND ENGINE CLUTCH HYDRAULIC CIRCUIT

[72] Inventors: Roy C. Ross; Larry L. Bandy, both of Springfield, Ill.

[73] Assignee: Allis-Chalmers Manufacturing Company, Milwaukee, Wis.

[22] Filed: Nov. 9, 1970

[21] Appl. No.: 88,007

[52] U.S. Cl..............................180/6.7, 180/66 R, 184/6 R, 192/113 B
[51] Int. Cl...........................................................B62d 11/08
[58] Field of Search...............180/6.7, 6.2, 66 R; 74/720.5; 184/6 R; 192/113 B

[56] References Cited

UNITED STATES PATENTS

| | | | |
|---|---|---|---|
| 3,044,589 | 7/1962 | Klave | 180/6.7 X |
| 3,095,760 | 7/1963 | Christenson | 74/720.5 UX |
| 3,366,210 | 1/1968 | Webster | 192/113 B |
| 3,378,119 | 4/1968 | Schaefer | 180/6.7 X |
| 3,385,412 | 5/1968 | Isgren | 192/113 B |

FOREIGN PATENTS OR APPLICATIONS

| | | | |
|---|---|---|---|
| 1,305,871 | 8/1962 | France | 180/6.7 |
| 1,119,685 | 7/1968 | Great Britain | 180/6.7 |

Primary Examiner—Benjamin Hersh
Assistant Examiner—John A. Pekar
Attorney—Charles L. Schwab, Robert B. Benson and Kenneth C. McKivett

[57] ABSTRACT

A hydraulic system in a crawler tractor having a single pump which supplies high pressure fluid for operating the steering clutches and low pressure fluid for lubricating the engine clutch and change-speed transmission. The engine clutch flywheel acts as an impositive displacement centrifugal pump for conveying fluid from the engine clutch housing to the low pressure side of the hydraulic system.

6 Claims, 4 Drawing Figures

PATENTED MAY 2 1972 3,659,668

Inventors
Roy C. Ross
Larry L. Bandy
By Charles L. Schwab
Attorney

3,659,668

STEERING CLUTCH AND ENGINE CLUTCH HYDRAULIC CIRCUIT

SUMMARY OF THE INVENTION

This invention relates to a fluid supply system providing high pressure fluid for steering clutch control and low pressure fluid for lubricating the change-speed transmission and engine clutch. In this system, a single high pressure pump driven by the engine is employed to supply the flow of fluid to the steering clutches, the transmission and the engine clutch, and the flywheel part of the engine clutch assembly is employed as a pumping element to convey fluid from the engine clutch housing to the low pressure side of the system. In prior systems, two engine drive pumps have been employed in the hydraulic system for operating the steering clutches and for lubricating the engine clutch and change-speed transmission.

It is a primary object of this invention to provide an improved crawler tractor fluid system for controlling steering clutches and for lubricating the engine clutch and change-speed transmission.

It is a further object of this invention to provide a hydraulic control system for a crawler tractor wherein a single high pressure pump supplies fluid for operating the hydraulic actuators for steering clutches and for lubricating the engine clutch and the change-speed transmission.

It is a further object of this invention to provide a hydraulic system of the type hereinbefore outlined wherein the engine clutch flywheel acts as a centrifugal pump to transfer fluid from the engine clutch housing to the low pressure or reservoir part of the system.

These and other objects and advantages of the present invention will be apparent to those familiar with the art when the following description is read in conjunction with the drawings in which.

DETAILED DESCRIPTION OF THE INVENTION

Figures 1, 2, 3, 4:
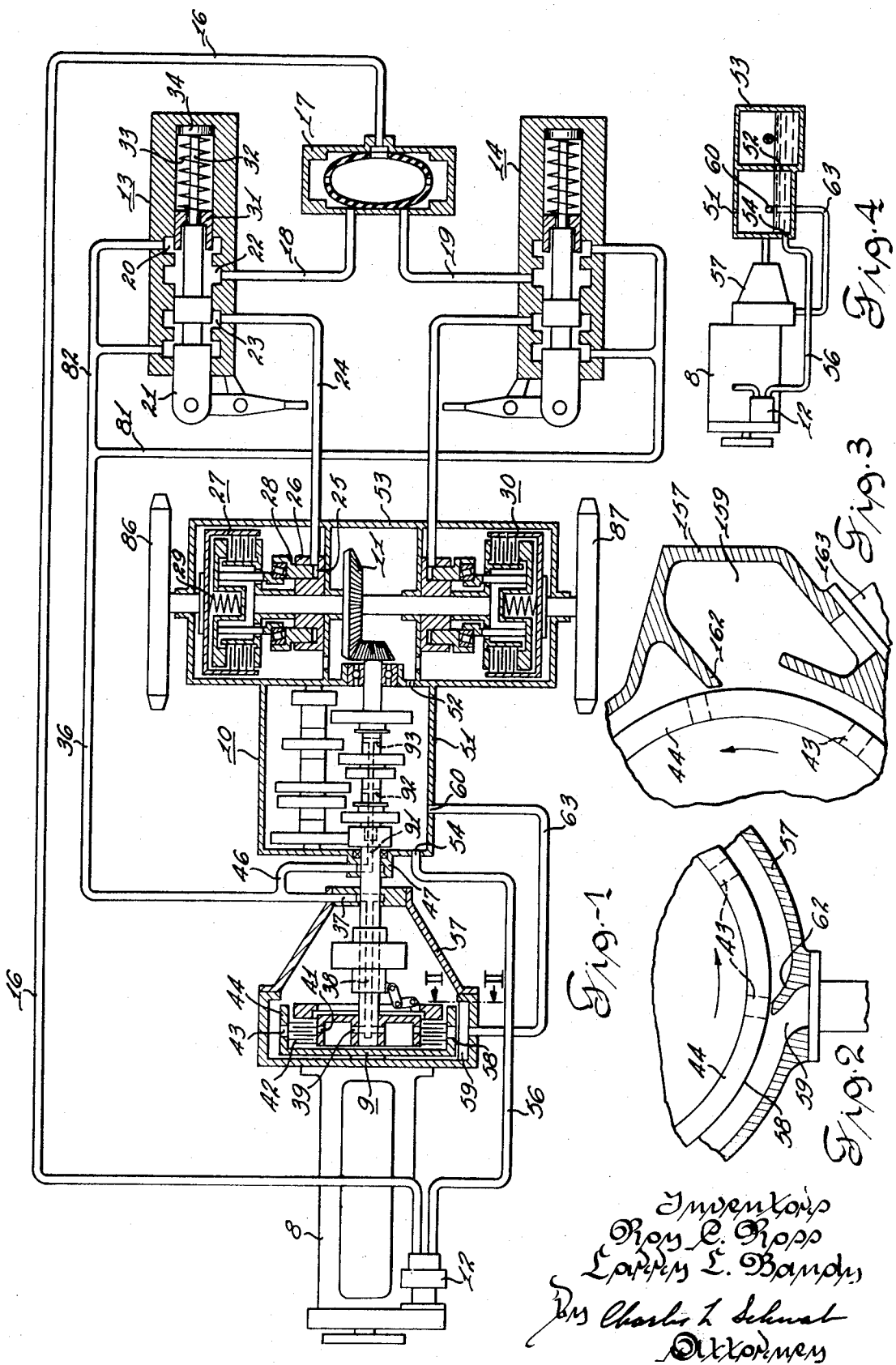
FIG. 1 is a schematic top view of a crawler tractor incorporating the present invention.
FIG. 2 is a section taken along the lines II—II in FIG. 1.
FIG. 3 is a section showing a modified form of the engine flywheel centrifugal pump.
FIG. 4 is a side view of power train components of a crawler tractor incorporating the present invention.

Referring to FIG. 1, the crawler tractor in which the present invention is incorporated has a power train including an internal combustion engine 8, an engine clutch 9, a change-speed transmission 10, and a final drive 11. The final drive includes a pair of steering clutches 27, 30 and drive sprockets 86, 87 adapted to engage endless track belts, not shown. A positive displacement pump 12 is connected in driven relation to the engine 8 and supplies high pressure fluid to steering clutch control valves 13, 14 by way of a supply conduit 16, a flow divider 17 and branch conduits 18, 19. On leftward movement of a control valve spool 21 of valve 13, as viewed in FIG. 1, an exhaust port 20 will be blocked, a receiving port 22 will be connected to a clutch supply port 23 and high pressure fluid will be conveyed by a conduit 24 to a pressure chamber 25 of a hydraulic actuator 26 for the steering clutch 27, thereby causing a piston 28 to move against the bias of a spring 29 and disengage the steering clutch 27. A valve part 31 slidingly mounted on a reduced end portion 32 of the spool 21 acts as a relief valve under the influence of a spring 33 carried between the valve part 31 and an enlarged portion 34 on the extreme right end of the spool 21. In the normal engaged condition of the steering clutch 27, the valve 21 will be in the position illustrated. If the other steering valve 14 is in the same position, low pressure fluid will flow through the valves 13 and 14 to a conduit 36 by way of branch conduits 81, 82 and thence through passages 37, 38, 39 and 41 to a disk pack 42 of the engine clutch 9. The hydraulic fluid lubricates the disk pack 42 and then passes through openings 43 in the engine clutch flywheel 44. Low pressure fluid will also flow by way of a branch conduit 46 to a transmission input shaft bearing 47 and through lubricating passages 91, 92, 93.

Referring to FIG. 4, the lubricating fluid will accumulate in the change-speed transmission housing 51 and the final drive housing 53 which are interconnected by an opening 52. The input conduit 56 for pump 12 is connected to port 54 of the housing 51. Thus, it is seen that the housings 51, 53 are the fluid reservoir for the fluid supply system and may herein be referred to as the low pressure side of the system.

The engine clutch housing 57 includes walls defining a chamber 59 to which the rotating flywheel 44 delivers fluid. The lip 62 extending radially inwardly from the housing 57 terminates in close proximity to the cylindrical outer surface 58 of the flywheel 44. The fluid collected in the chamber 59 is conveyed to the transmission housing 51 by a conduit 63. This slinger or centrifugal type pump and its principle of operation are well known in the art, and such a pump can take several forms. For instance, in the modification of FIG. 3, the pressure chamber 159 is formed at one lateral side of the engine clutch housing 157 and oil is thrown upwardly by the flywheel 44 and collected by a radially inwardly extending lip 162. The chamber 159 is connected to an associated transmission housing, not shown, by a conduit 163. It will be noted that the connection or port 60 by which the conduit 63 connects to the housing 51 is spaced sufficiently above the bottom of the housing 51 to insure that fluid will not flow from the transmission housing 51 to the engine clutch housing 57 when the crawler tractor is in an inclined position, such as when going down or backing up an incline.

Although only the operation of the steering clutch 27 has been described, it should be understood that steering clutch 30, which is a reverse image of clutch 27, is disengaged in the same manner upon operation of valve 14.

From the foregoing description, it is seen that a hydraulic system is provided for a crawler tractor which supplies high pressure fluid to the steering clutches 27, 30 to release them upon operation of their associated valves 13, 14 and which conveys the fluid flowing through the valves 13, 14, when in their illustrated bypass position, to the engine clutch 9 and the change-speed transmission 10 to lubricate them. Fluid collecting in the engine clutch housing 57 is returned to the housings 51, 53, which together serve as the reservoir for the fluid system, by the pumping action of the engine clutch flywheel.

The embodiments of the invention in which an exclusive property or privilege is claimed are defined as follows:

1. In a hydraulic control and lubrication system for the power train of a crawler tractor of the type having an engine, an engine clutch, a change-speed transmission including a housing, a final drive including a housing, and a pair of steering clutches each operated by a hydraulic actuator; said system comprising:
   an engine driven pump;
   a control valve for each of said steering clutches including a receiving port, a clutch supply port and an exhaust port;
   supply conduit means connecting said receiving ports of said valves in fluid receiving relation to said pump;
   output conduits connecting the clutch supply ports of said valves to said hydraulic actuators, respectively;
   lubricating passages in said engine clutch;
   conduit means connecting the exhaust ports of said valves to said lubricating passages;
   an engine clutch flywheel driven by said engine;
   a clutch housing secured to said engine in surrounding relation to said engine clutch flywheel including wall means forming a chamber disposed radially outwardly of said flywheel so as to receive fluid thrown from said flywheel by centrifugal force;
   conduit means connecting said chamber with one of said transmission and final drive housings; and
   conduit means connecting said pump in fluid receiving relation to one of said housing.

2. The invention set forth in claim 1 and further comprising lubrication passages in said change-speed transmission and conduit means placing said lubrication passages in fluid communication with said exhaust ports.

3. The invention defined in claim 1 wherein said conduit means between said chamber and said one housing is connected to the latter at a point spaced sufficiently from the bottom thereof to prevent transfer of fluid from said one housing to said engine clutch housing.

4. The invention of claim 1 wherein said wall means defining said chamber includes a fluid collector lip extending radially inwardly terminating in close proximity to said flywheel.

5. The invention of claim 4 and further comprising lubrication passages in said change-speed transmission and conduit means placing said lubrication passages in fluid communication with said exhaust ports.

6. The invention of claim 5 wherein said conduit means between said chamber and said one housing is connected to the latter at a point spaced sufficiently from the bottom thereof to prevent transfer of fluid from said one housing to said engine clutch housing.

* * * * *